United States Patent
Hauber et al.

(10) Patent No.: US 8,020,806 B2
(45) Date of Patent: Sep. 20, 2011

(54) AERONAUTICAL HIGH-LIFT SYSTEM WITH AN OVERLOAD SAFETY DEVICE

(75) Inventors: Bernhard Hauber, Weiler (DE); Christian Kohloeffel, Amtzell (DE)

(73) Assignee: Liebherr-Aerospace Lindenberg GmbH, Lindenberg/Allgaeu (DE)

( * ) Notice: Subject to any disclaimer, the term of this patent is extended or adjusted under 35 U.S.C. 154(b) by 0 days.

(21) Appl. No.: 11/149,127

(22) Filed: Jun. 9, 2005

(65) Prior Publication Data

US 2006/0060719 A1 Mar. 23, 2006

(30) Foreign Application Priority Data

Jun. 9, 2004 (DE) .................. 10 2004 028 165
Nov. 18, 2004 (DE) .................. 10 2004 055 740

(51) Int. Cl.
*B64C 13/24* (2006.01)
(52) U.S. Cl. ..................................... 244/76 A
(58) Field of Classification Search ................. 74/73.12, 74/480 R, 664–665 R; 244/76 A, 75.1, 211–213, 244/215, 194

See application file for complete search history.

(56) References Cited

U.S. PATENT DOCUMENTS

| 2,826,064 | A | * | 3/1958 | Hastings | 73/862.332 |
|---|---|---|---|---|---|
| 3,861,485 | A | * | 1/1975 | Busch | 180/65.7 |
| 4,180,222 | A | * | 12/1979 | Thornburg | 244/225 |
| 4,496,105 | A | * | 1/1985 | Fleming et al. | 241/32 |
| 4,779,822 | A |  | 10/1988 | Burandt et al. |  |
| 4,811,777 | A | * | 3/1989 | Chretien | 160/201 |
| 5,593,109 | A |  | 1/1997 | Williams |  |
| 5,600,220 | A | * | 2/1997 | Thoraval et al. | 318/562 |
| 6,392,373 | B1 | * | 5/2002 | Glasgow et al. | 318/430 |
| 7,051,975 | B2 | * | 5/2006 | Pohl et al. | 244/213 |
| 2004/0251382 | A1 |  | 12/2004 | Schievelbusch |  |

FOREIGN PATENT DOCUMENTS

| DE | 10308301 | 7/2004 |
|---|---|---|
| EP | 0922633 | 6/1999 |
| EP | 1029784 | 8/2000 |
| WO | 9009314 | 8/1990 |

\* cited by examiner

*Primary Examiner* — Tien Dinh
(74) *Attorney, Agent, or Firm* — Dilworth & Barrese, LLP.

(57) ABSTRACT

An aeronautical high-lift system comprising a drive unit, elements for the transmission of the drive energy to drive stations of individual segments of landing flap/slat flap systems as well as comprising an overload safety device, with the overload safety device having at least one electrical overload sensor which is arranged in the drive chain between the drive unit and an output drive station.

10 Claims, 4 Drawing Sheets

AERONAUTICAL HIGH-LIFT SYSTEM WITH AN OVERLOAD SAFETY DEVICE

BACKGROUND OF THE INVENTION

The invention relates to an aeronautical high-lift system comprising a drive unit, elements for the transmission of the drive energy to drive stations of individual segments of landing flap/slat flap systems and comprising an overload safety device.

Aeronautical high-lift systems comprising a central drive unit which is in connection with an auxiliary drive for two wing halves are known. FIG. 4 shows such a high-lift system in accordance with the prior art. The transmission of the right wing is illustrated. The drive unit 10 is in connection with the transmissions of the two wings via the auxiliary drive 20. The system load limiter 50 is located between the heavy duty transmission 30 and the low load transmission 40 of the wing. Load stations of the wing flaps are designated by the reference numeral 60. The reference symbol 62 designates the transmission brake.

The required drive torque of the drive unit 10 is determined by the loads of the two wing transmissions. If a jam or seizure occurs in the system (e.g. at the load stations 60 of the wing flaps), then the load in the transmission of the affected wing rises until the system load limiter 50 prevents a further load rise in the low load transmission 40. In this situation, the entire drive torque is conducted into one wing up to the system load limiter 50. It has the task of protecting at least a portion of the transmission of a wing from the drive torque of two wings.

A spring biased ball ramp mechanism is usually used as a system load limiter 50 and in the event of an overload actuates a further mechanism which leads off the overload into the airplane structure and in this way protects the low load transmission 40.

It cannot be prevented by the braking of the drive unit 10 that a large torque builds up in the heavy duty transmission 30 as a result of the kinetic drive energy and of the blocking torque. The heavy duty transmission 30 and the devices which are located within it must thus be designed for a very heavy load/load peak. There results from this the disadvantage of a large weight of the heavy duty transmission 30 and of the affected devices.

SUMMARY OF THE INVENTION

It is the object of the present invention to achieve a load reduction and thus a weight reduction in an aeronautical high-lift system of the initially named kind.

This object is solved in accordance with the invention by an aeronautical high-lift system.

The overload safety device accordingly comprises at least one electrical overload sensor which is arranged in the drive chain between the drive unit and an output drive station. This also comprises the case in which the overload sensor is arranged in an output drive station or measures its load. An overload state can be rapidly detected by means of the electrical overload sensor, whereby the load in the transmission can be rapidly reduced and consequently the weight of the transmission and of the devices concerned can be reduced.

In a preferred embodiment of the invention the overload safety device comprises a mechanically actuated electrical overload sensor.

The overload sensor can be arranged in the drive chain within the output drive station disposed closest to the drive unit.

In a further embodiment of the present invention, an electronic regulator is provided which is in connection with the overload sensor or sensors as well as with the drive unit and which has means by which an electrical signal can be fed into the drive unit on reception of a load which exceeds a threshold value.

In order to be able to reduce the drive energy very rapidly and preferably to hold the system at a low load level, provision can be made for the signal to result in a reversed operation and preferably in a stopping of the drive unit. Provision can be made for the regulator algorithm of the regulator to be designed such that, after the arrival of an overload signal, a reversal of the desired value of the direction of rotation specified to the drive unit is generated until the actual value of the speed of rotation of the drive assumes the value zero.

Furthermore, provision can be made for the drive unit to comprise high-dynamic drives, in particular hydraulic motors with an adjustable displacement volume or brushless direct current motors, for the rapid regulation of the drive power.

It is particularly advantageous for the overload sensor or sensors to comprise or to be in connection with a mechanical element which reduces the stiffness to twisting of the unit when a set maximum torque is exceeded. This mechanical element can, for example, be a ball ramp mechanism.

Furthermore, provision can be made for the overload sensor or sensors to have or to consist of an electromagnetic switch or an inductive proximity switch.

BRIEF DESCRIPTION OF THE DRAWINGS

Further details and advantages of the invention will be explained in more detail with reference to an exemplary embodiment which is illustrated in the drawings. There are shown.

DESCRIPTION OF THE PREFERRED EMBODIMENTS

Figure 1:
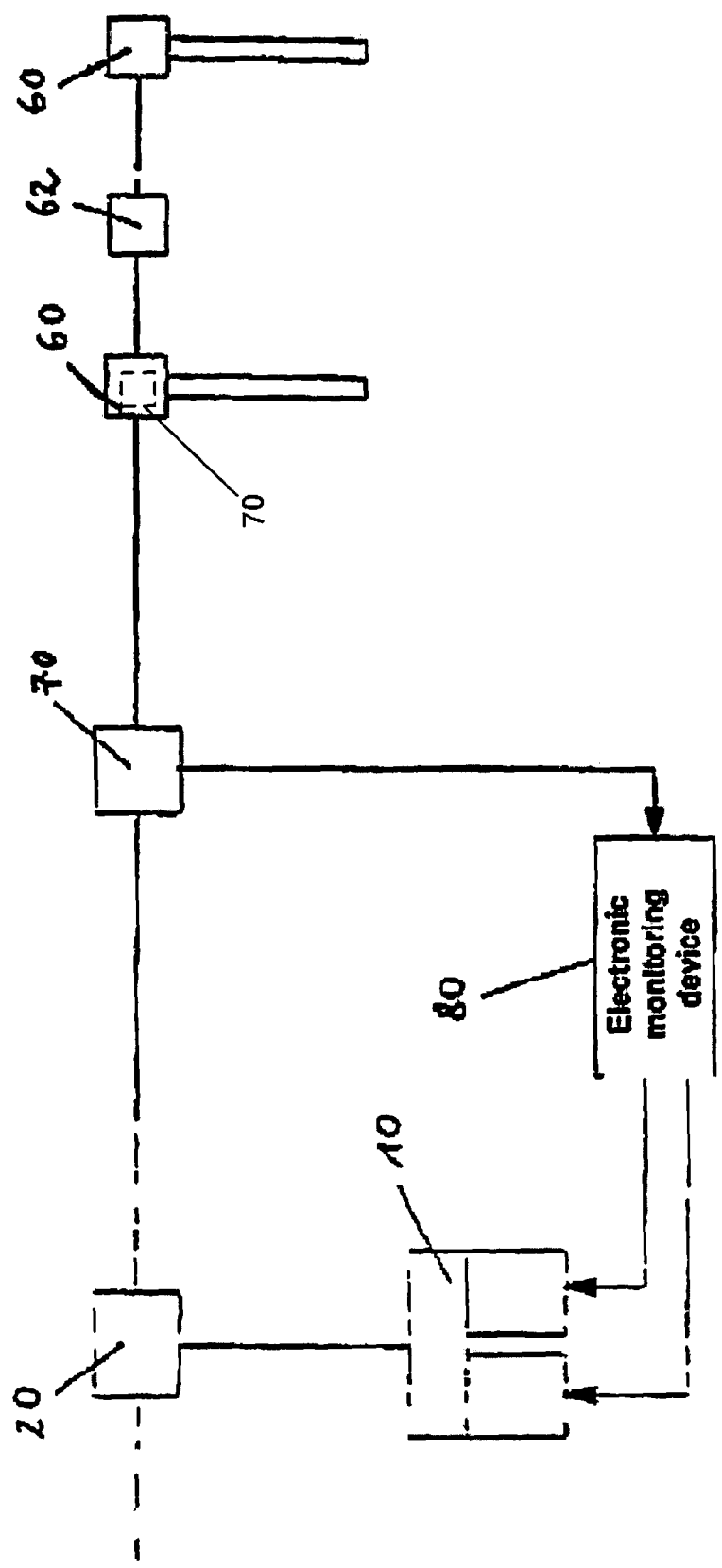
FIG. 1: a schematic view of the aeronautical high-lift system in accordance with the invention.

FIG. 1 shows the drive unit 10, which is connection with the transmissions of the two wings via the auxiliary drive 20. The transmission serves to transmit the drive energy over the entire wing span. The system load limiter 70 or a sensor unit is provided in the transmission and is located in the drive chain or in the central drive shaft between the drive unit 10 or the auxiliary drive 20 and the load stations 60 of the wing flaps. The reference numeral 62 designates the transmission brake. The electronic monitoring device is designated by the reference numeral 80 and is, as can be seen in FIG. 1, in connection both with the system load limiter 70 and with the drive unit 10. The drive unit 10 consists of hydraulic motors with adjustable displacement volume or brushless direct current motors.

Alternatively to the arrangement shown in FIG. 1, provision can furthermore be made for the sensor unit to be arranged in the first load station 60 (seen from the rear of the airplane). The load of the first station 60 is measured and an indication of an overload is reported to the electronic monitoring device 80. In an embodiment of the invention of this kind, the further steps preferably take place in accordance with the procedure which is described pertaining to FIG. 1. The sensor unit which measures the load of the first station 60 is preferably the system load limiter shown in FIG. 2a. Generally, other sensor units can also be used.

The system load limiter 70 is a mechanically actuated electrical overload sensor.

If a system seizure occurs, the load is determined by the system load limiter 70 or a sensor unit. The load is compared with a threshold value. If the result of this comparison is that the actual value of the load lies above the threshold value, the electronic monitoring device 80 emits a corresponding signal to regulate the motors of the drive unit 10 down, as is indicated in FIG. 1. The comparison between the actual value of the load and the threshold value can take place in the system load limiter 70 or a sensor unit or also in the electronic monitoring device 80, which comprises an electronic regulator. As a result of the high-dynamic drives of the drive unit 10, the drive power can be reduced very rapidly, whereby the load in the transmission can be reduced, and it and the components contained in it can be designed with a correspondingly lighter weight. A mechanism which is in connection with the system load limiter 70 and which conducts the overload into the airplane structure, however, do not necessarily have to be provided.

Figure 2:
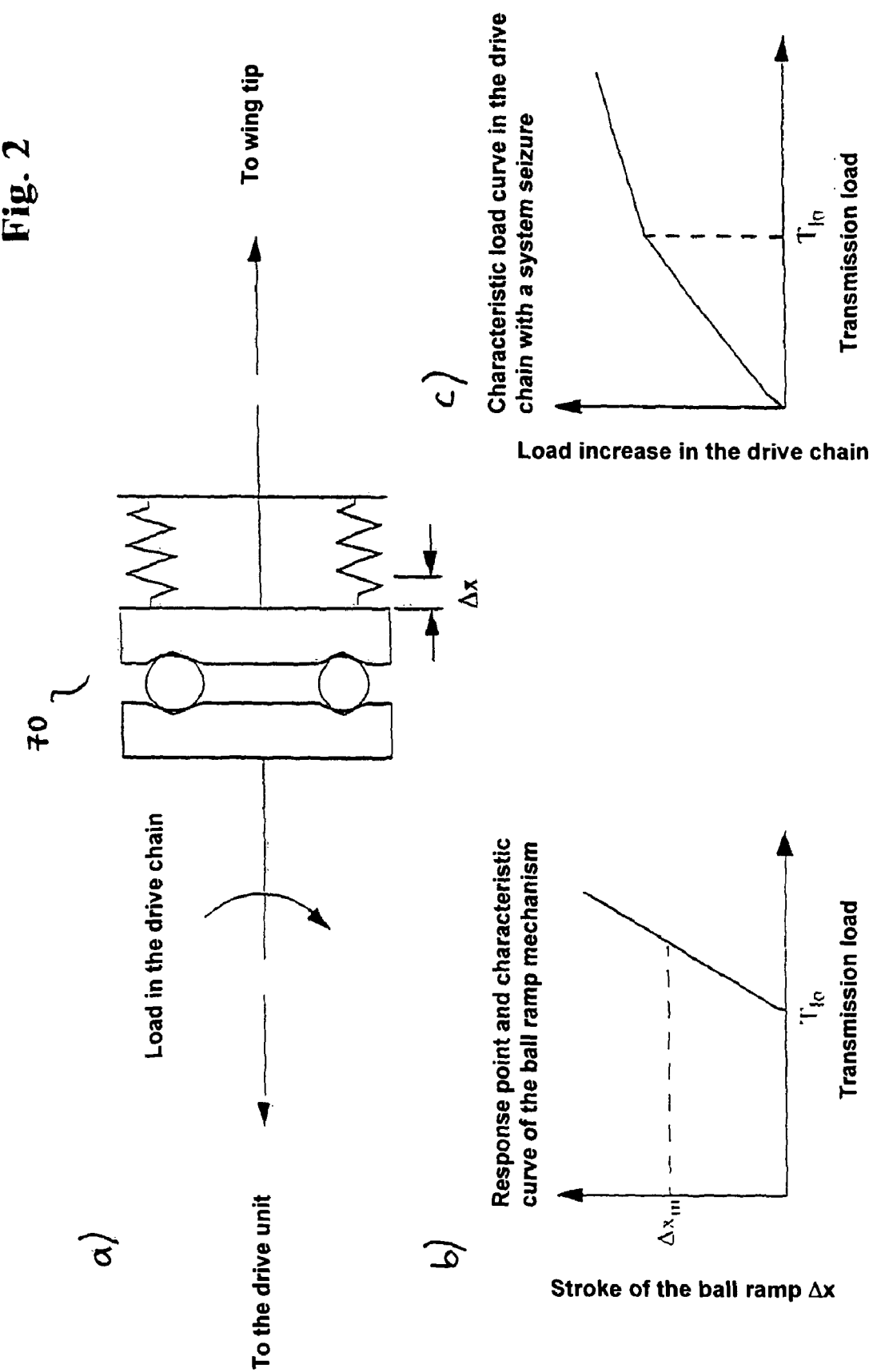
FIG. 2: a schematic view of the spring biased ball ramp mechanism with various characteristic curves.

Furthermore, the system load limiter 70 has a spring biased ball ramp mechanism which is deflected when the load exceeds the permitted amount in the case of a system seizure. Details of this are shown in FIG. 2, which in FIG. 2a shows a schematic illustration of the ball ramp mechanism. The response point and the characteristic curve of the ball ramp mechanism are reproduced in FIG. 2b, and the load characteristic curve in the drive chain in the event of a system seizure is reproduced in FIG. 2c. As can be seen from FIG. 2b, the ball ramp mechanism is deflected by an amount $\Delta x$ when the load of the transmission exceeds the value $T_{1o}$. This deflection can be detected by a suitable sensor, for example by a proximity switch, and transmitted to the electronic monitoring device 80. The threshold value of the deflection of the ball ramp mechanism is designated in FIG. 2b by the symbol $\Delta x_m$. If this threshold value is reached, the electronic monitoring device 80 emits signals to the drive unit 10 which lead to a rapid reduction of the drive torque.

A positive side effect of the ball ramp mechanism consists of the fact that the load no longer rises as steeply when the mechanism responds (load of the transmission $\geq T_{1o}$), as can be seen from FIG. 2c. Time is thus gained for the electronic monitoring.

Figure 3:
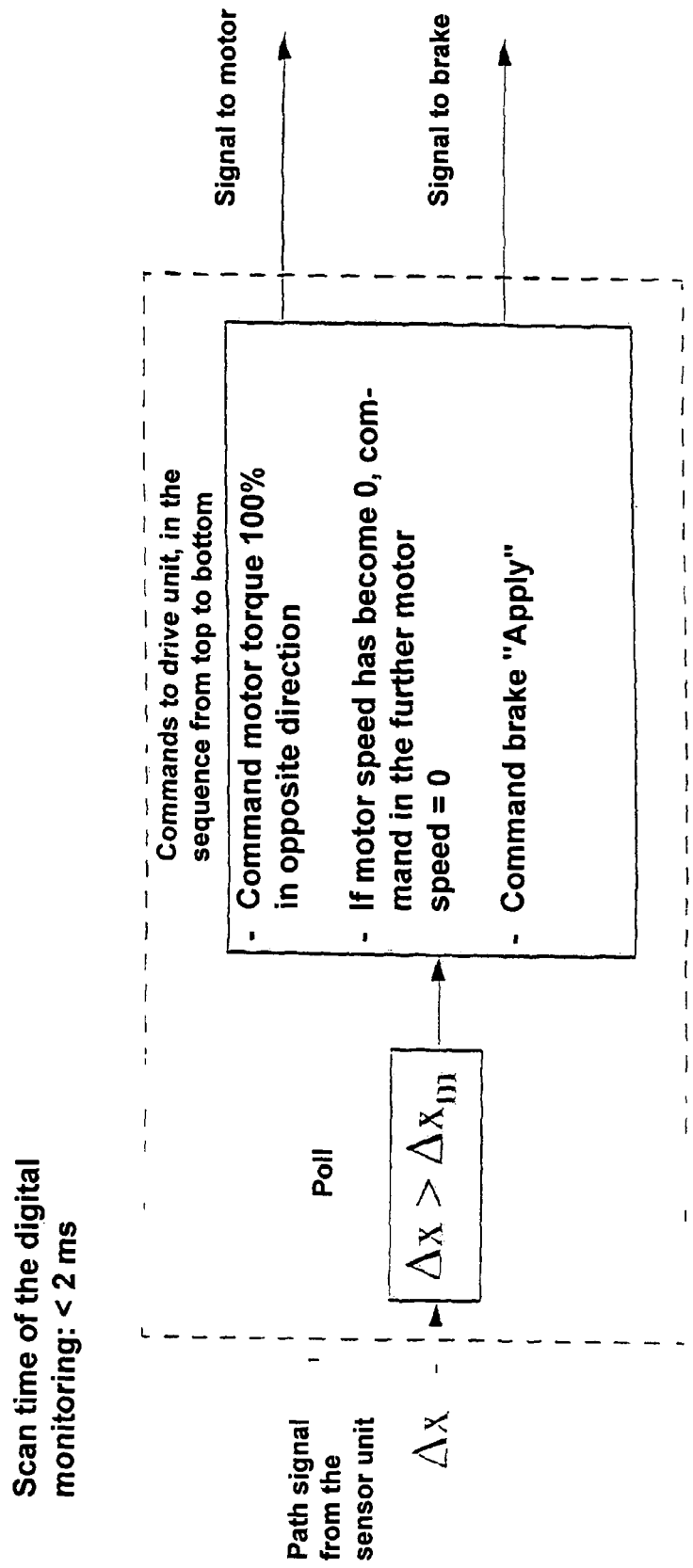
FIG. 3: a schematic view of the digital monitoring conception
Figure 4:
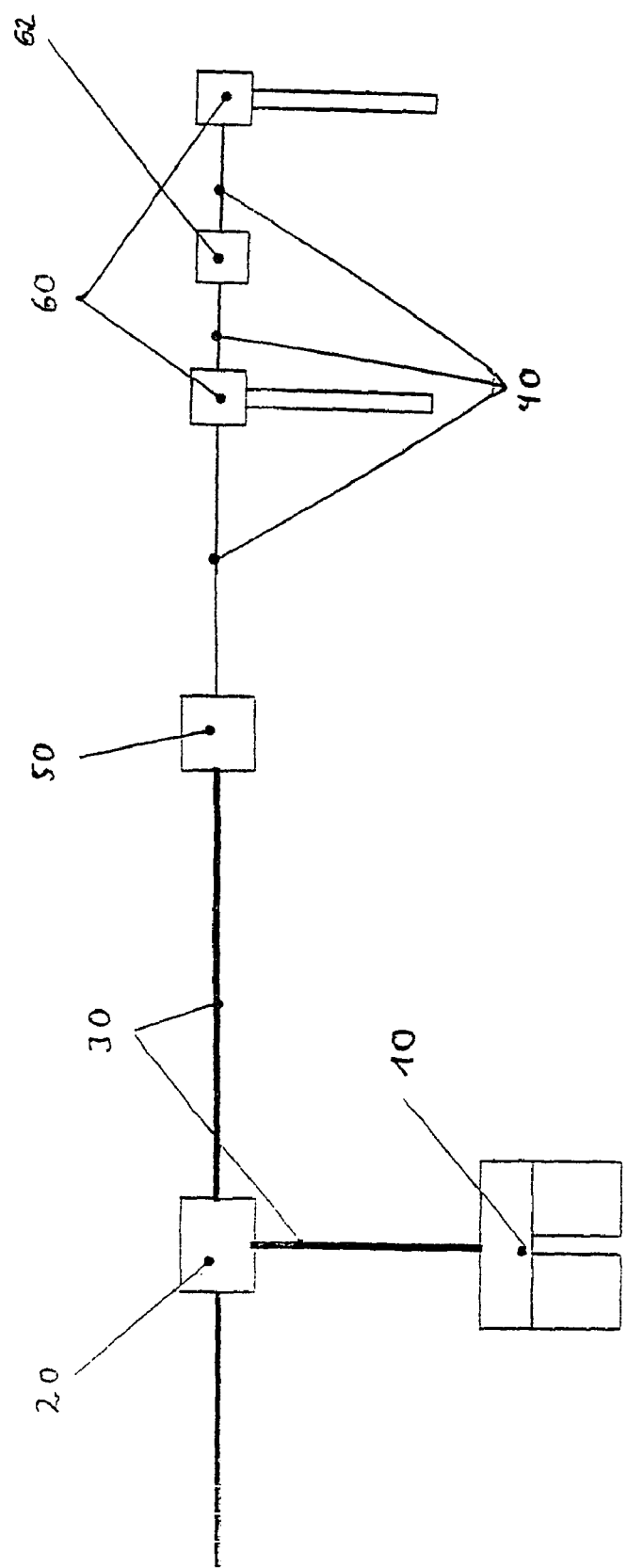
FIG. 4: a schematic view of an aeronautical high-lift system in accordance with the prior art.

FIG. 3 shows a schematic illustration of the electronic monitoring device 80, which has an electronic regulator. As can be seen from FIG. 2, the path distance signal $\Delta x$ is detected by a sensor unit and transmitted to the electronic monitoring device 80. It is polled here whether the path distance signal exceeds the threshold value $\Delta x_m$. If this is the case, the electronic monitoring device emits the following commands or signals to the drive unit:

The motor torque is switched to 100% in the opposite direction; if the speed of rotation of the motor is 0, this value is maintained; furthermore, the brake receives the command: "apply".

On reception of a load which exceeds the threshold value, an electrical signal is thus fed in to the drive system, which has the result that the drive energy is very rapidly reduced through reverse operation of the drive unit and the system is held at a low load level.

In summary, the following advantages can be achieved with the present invention. A substantial load reduction and thus a weight reduction are achieved. An indication and reporting back of overloads as a result of system seizures is possible. This indication can be integrated into various system components which are already present. A delay in the load rise on overloads can be achieved by a corresponding constructional design of the mechanism for the indication. Furthermore, a digital monitoring concept can be provided which is in connection with the overload sensor as well as with the drive unit. A reduction of the overload can be achieved particularly rapidly by an actively regulated reduction of the output torque by "trimming". Furthermore, the function of the system can be tested without further ado.

In addition to the already named load and weight reduction, the aeronautical high-lift system in accordance with the invention has the advantage of a high reliability and is simple to test in order to ensure a correct functioning over its entire lifetime.

The overload safety device in accordance with the invention can be tested relatively simply. The test function described in the following is carried out on the ground and can take place in conjunction with the testing of the transmission brake which is done from time to time. For this purpose, one of the two transmission brakes (right or left wing) is arrested. Then the drive unit is operated against the brake at low speed of rotation and at a specific drive torque. The drive torque conforms to the response behavior of the ball ramp mechanism and must be so large that the deflection $\Delta x_m$ is reached with certainty. When the drive unit comes to a standstill as a result of the applied transmission brake, an indication with respect to the deflection $\Delta x_m$ must occur.

If it does not occur, a faulty overload safety device must be assumed. The procedure is repeated for a second wing half after successful completion for a wing half.

The invention claimed is:

1. An aeronautical high-lift system comprising
a drive unit,
elements for the transmission of the energy produced by said drive unit to one or more output drive stations of individual segments of landing flap/slat flap systems
an overload safety device comprising at least one electrical overload sensor arranged in the drive chain between the drive unit and the one or more output drive stations, and
an electronic regulator communicatively coupled with the overload sensor and the drive unit for receiving torque related signals from the overload safety device and for receiving an overload signal from the overload safety device in the event an overload is detected by the overload safety device, wherein said electronic regulator comprises means for supplying an electrical signal to the drive unit, responsive to the electronic regulator receiving said overload signal, to effect an immediate reversal operation causing a reversal of a desired value of the direction of rotation specified to the drive unit until the actual value of the speed of rotation of said drive unit assumes the value zero and maintaining the value zero by applying braking means to the drive unit, thereby rapidly reducing the load on the transmission system before the drive unit is stopped
wherein applying said rapid reversal operation achieves a load reduction in the transmission system thus allowing a corresponding weight reduction in the design of the transmission system over conventional transmission systems.

2. An aeronautical high-lift system in accordance with claim 1, wherein the at least one electrical overload sensor is mechanically actuated.

3. An aeronautical high-lift system in accordance with claim 1, wherein one of the at least one overload sensor is arranged within an output drive station located closest to the drive unit.

4. An aeronautical high-lift system in accordance with claim 1, wherein, after the arrival of an overload signal, the electronic regulator generates a reversal of the desired value of the direction of rotation specified to the drive unit the actual value of the speed of rotation of the drive unit is zero.

5. An aeronautical high-lift system in accordance with claim 1, wherein the at least one overload sensor comprises a mechanical element which reduces the stiffness to twisting of the unit when a set maximum torque is exceeded.

6. An aeronautical high-lift system in accordance with claim 5, wherein the mechanical element is a ball ramp mechanism.

7. An aeronautical high-lift system in accordance with claim 1, wherein the overload sensor or sensors is an electromagnetic switch.

8. An aeronautical high-lift system in accordance with claim 1, wherein the drive unit comprises hydraulic motors with adjustable displacement volume.

9. An aeronautical high-lift system in accordance with claim 1, wherein the drive unit comprise brushless direct current motors.

10. An aeronautical high-lift system in accordance with claim 1, wherein the at least one overload sensor is an inductive proximity switch.

* * * * *